US005524406A

United States Patent [19]
Ragland

[11] Patent Number: 5,524,406
[45] Date of Patent: Jun. 11, 1996

[54] INSULATING APPARATUS AND METHOD FOR ATTACHING AN INSULATING PAD TO A SUPPORT

[75] Inventor: Raymond E. Ragland, Union, Mo.

[73] Assignee: ATD Corporation, St. Louis, Mo.

[21] Appl. No.: 216,870

[22] Filed: Mar. 24, 1994

[51] Int. Cl.$^6$ ............................ E04B 1/74; B23K 11/00
[52] U.S. Cl. .................... 52/406.2; 52/404.2; 52/745.19; 52/783.14; 52/789.1; 52/792.1; 52/794.1; 52/797.1; 52/798.1; 52/800.12; 52/DIG. 15; 219/78.12; 219/91.21; 219/91.23; 219/117.1; 428/594
[58] Field of Search .......................... 52/791, 792, 802, 52/809, 813, 814, 823, 824, 815, 816, 825, DIG. 15, 795, 796, 797, 798, 406.1, 406.2, 406.3, 404.2, 404.3, 407.1, 407.2, 788.1, 789.1, 792.1, 794.1, 797.1, 741.1–750, 782–830, 404.1–413; 219/117.1, 78.11, 78.12, 91.21, 91.23; 428/593, 594

[56] References Cited

U.S. PATENT DOCUMENTS

| | | |
|---|---|---|
| 829,966 | 9/1906 | Jefferis ............................ 52/816 |
| 1,385,790 | 1/1995 | Atkinson et al. .................. 428/593 |
| 1,568,080 | 1/1926 | Meadowcroft . |
| 1,750,643 | 3/1930 | Murray, Jr. et al. . |
| 1,890,418 | 12/1932 | Schmidt . |
| 1,934,174 | 11/1933 | Dyckerhoff . |
| 1,939,306 | 12/1933 | Leslie .............................. 52/406.1 X |
| 1,987,798 | 1/1935 | Ruppricht . |
| 2,050,074 | 8/1936 | Trytten ............................ 52/798 X |
| 2,180,373 | 11/1939 | Sibley et al. . |
| 2,212,481 | 8/1940 | Sendzimir . |
| 2,312,987 | 3/1943 | Grassick . |
| 2,441,476 | 5/1948 | Ewald . |
| 2,445,801 | 7/1948 | Partiot . |
| 2,481,046 | 9/1949 | Scurlock . |
| 2,926,761 | 3/1960 | Herbert, Jr. . |
| 2,963,128 | 12/1960 | Rapp . |
| 3,003,902 | 10/1961 | McDuff ............................ 52/406.2 X |
| 3,024,879 | 3/1962 | Kandra ............................ 219/78.12 X |
| 3,029,910 | 4/1962 | Kirk et al. . |
| 3,113,202 | 12/1963 | Nolen et al. . |
| 3,152,033 | 10/1964 | Black et al. . |
| 3,190,412 | 6/1965 | Rutter et al. . |
| 3,196,763 | 7/1965 | Rushton ........................... 52/792 X |
| 3,345,791 | 10/1967 | Shinefeld ......................... 52/824 X |
| 3,354,021 | 11/1967 | Royet . |
| 3,576,964 | 5/1971 | Williams ......................... 219/91.23 X |
| 3,592,993 | 7/1971 | Bennett . |
| 3,640,556 | 2/1972 | Bennett . |
| 3,916,141 | 10/1975 | Czohara .......................... 219/78.11 |
| 3,936,656 | 2/1976 | Middleton et al. . |
| 3,971,867 | 7/1976 | Randall ........................... 52/823 X |
| 4,038,447 | 7/1977 | Brock . |

(List continued on next page.)

FOREIGN PATENT DOCUMENTS

| | | | |
|---|---|---|---|
| 1200313 | 12/1959 | France ............................ 52/406.1 |
| 68180 | 4/1985 | Japan ............................ 219/117.1 |
| 730699 | 5/1955 | United Kingdom ............... 52/406.2 |
| 783184 | 9/1957 | United Kingdom . |
| WO82/00266 | 2/1982 | WIPO . |

OTHER PUBLICATIONS

"Development of Forming and Joining Techniques for Corrugated–Sandwich Structure," Welding Journal, Smallen and Romaine, Apr. 1960 pp. 317–318.

"Fundamental Data Pertaining to Resistance Welding," Welding, Hughes, Feb. 1932; pp. 84–85.

Primary Examiner—Carl D. Friedman
Assistant Examiner—Laura A. Saladino
Attorney, Agent, or Firm—Burns, Doane, Swecker & Mathis

[57] ABSTRACT

A method for making an insulating apparatus and an insulating apparatus made from such method having an insulating pad made up of a plurality of layers of metal foil, wherein at least two of the layers are separated from each other such that there are gas spaces between the layers, and a support for supporting at least a portion of the insulating pad and attached to the insulating pad by resistance welding, whereby the plurality of layers of metal foil are compressed around the area of the weld.

36 Claims, 5 Drawing Sheets

U.S. PATENT DOCUMENTS

| | | | |
|---|---|---|---|
| 4,186,535 | 2/1980 | Morton | 52/814 X |
| 4,271,649 | 6/1981 | Belanger | 52/809 X |
| 4,298,061 | 11/1981 | Hoeffken . | |
| 4,317,277 | 3/1982 | Bennett et al. | 219/91.21 X |
| 4,318,965 | 3/1982 | Blair . | |
| 4,386,128 | 5/1983 | Yoshikawa . | |
| 4,401,706 | 8/1983 | Sovilla . | |
| 4,614,855 | 9/1986 | Hinden . | |
| 4,650,951 | 3/1987 | Koga et al. . | |
| 4,671,979 | 6/1987 | Adiletta . | |
| 4,703,159 | 10/1987 | Blair . | |
| 4,724,295 | 2/1988 | Von Skarczinski | 219/117.1 |
| 4,759,964 | 7/1988 | Fischer et al. . | |
| 4,915,998 | 4/1990 | Parenti, Jr. et al. . | |
| 4,926,935 | 5/1990 | Haushalter . | |
| 4,996,095 | 2/1991 | Behdorf et al. . | |
| 5,011,743 | 4/1991 | Sheridan et al. . | |
| 5,018,328 | 5/1991 | Cur et al. | 52/406.2 |
| 5,111,577 | 5/1992 | Sheridan et al. . | |
| 5,252,408 | 10/1993 | Bridges et al. | 52/788.1 X |
| 5,424,139 | 6/1995 | Shuler et al. | 428/596 |

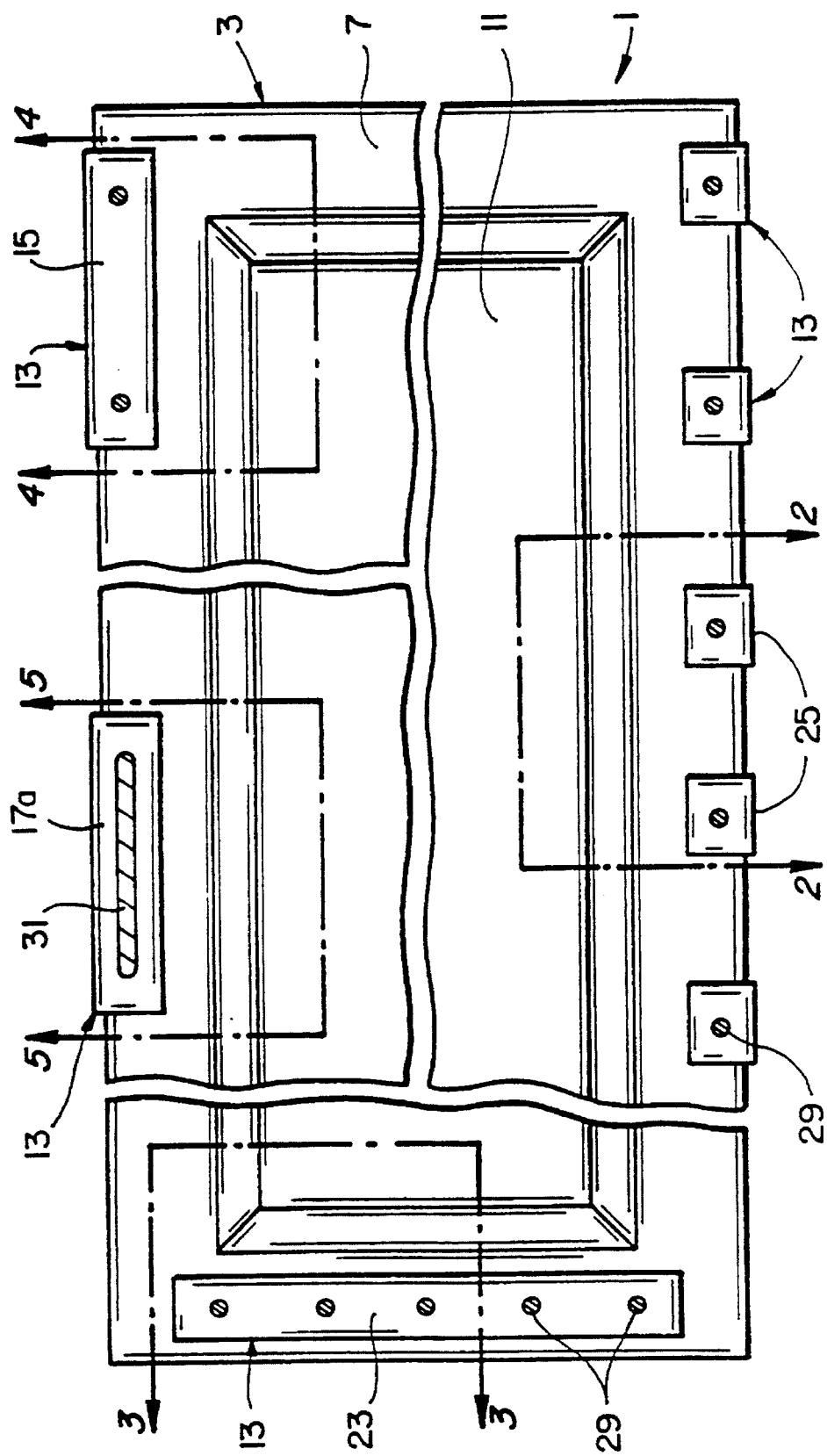
FIG_1

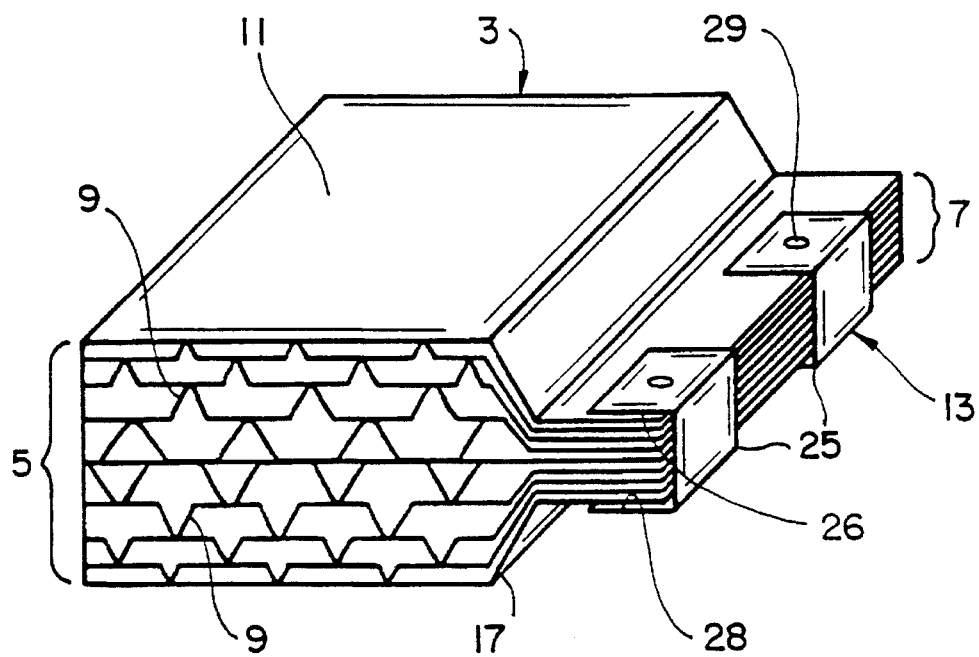
FIG_2
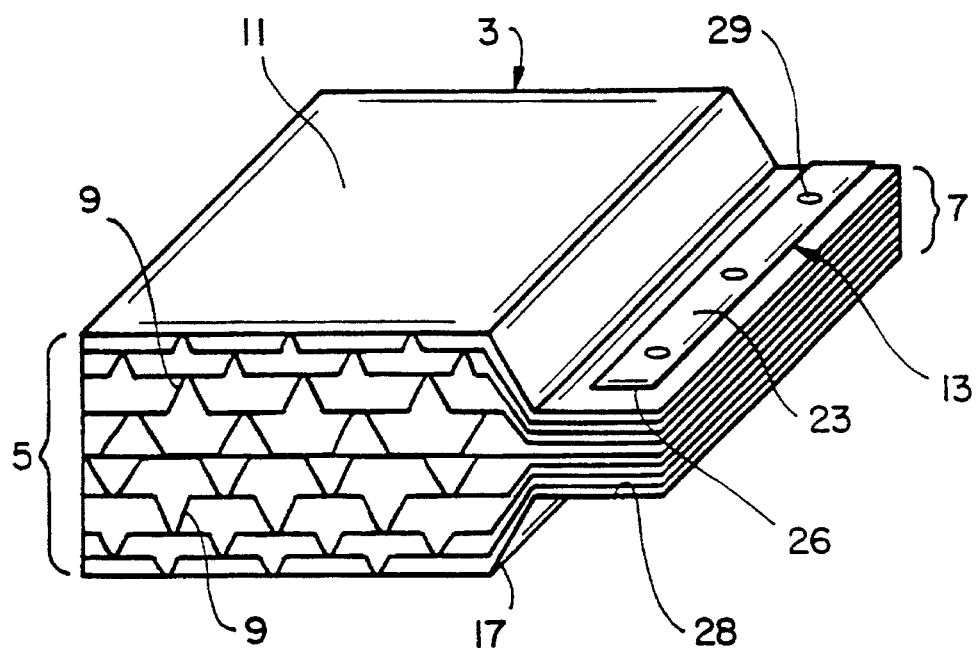
FIG_3

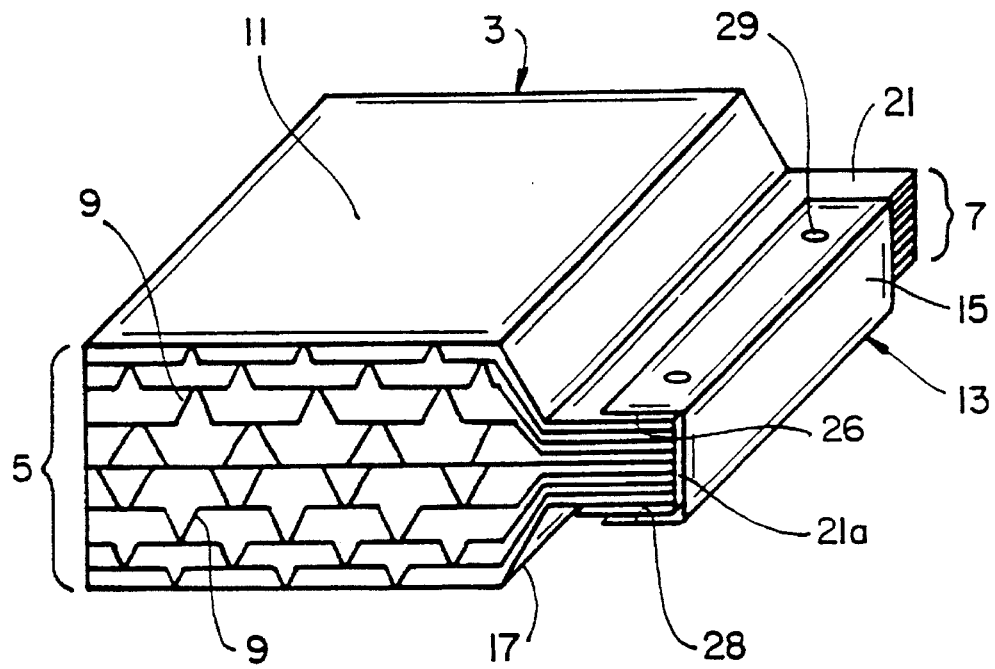
FIG_4
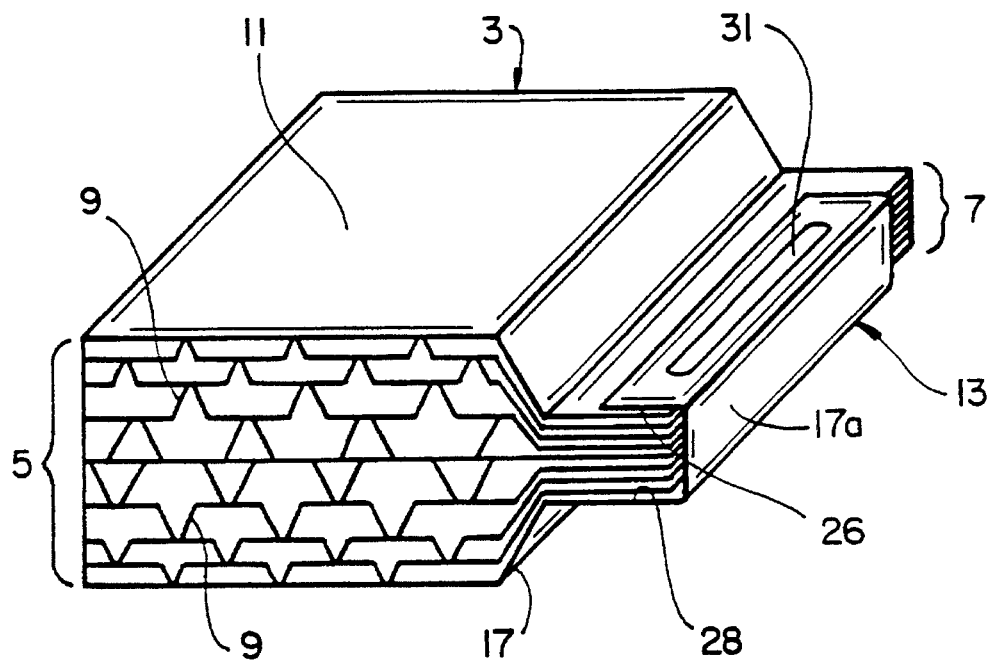
FIG_5

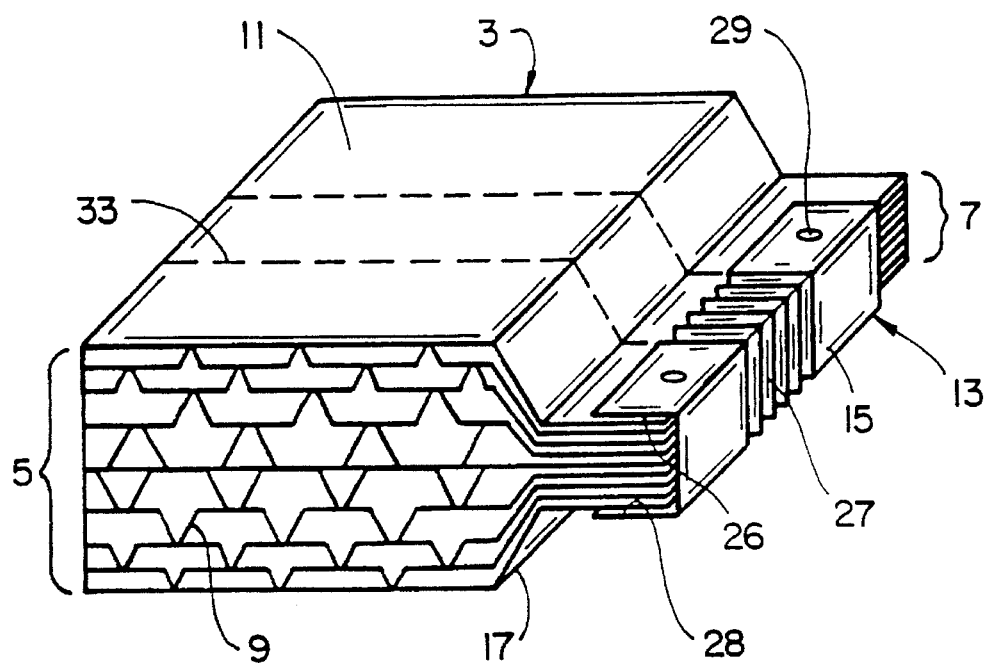
FIG_6
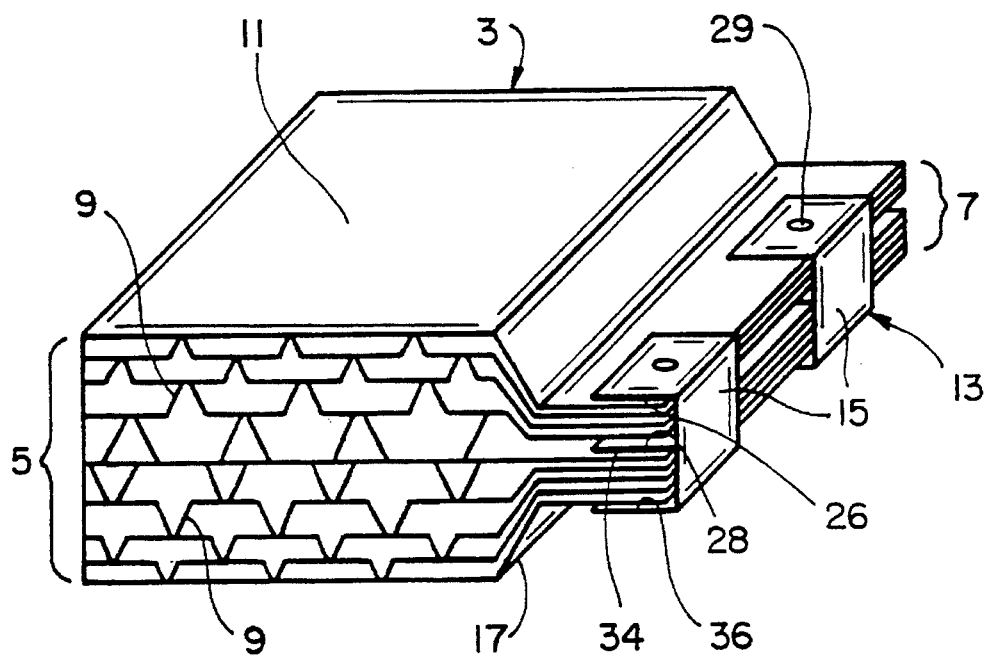
FIG_7

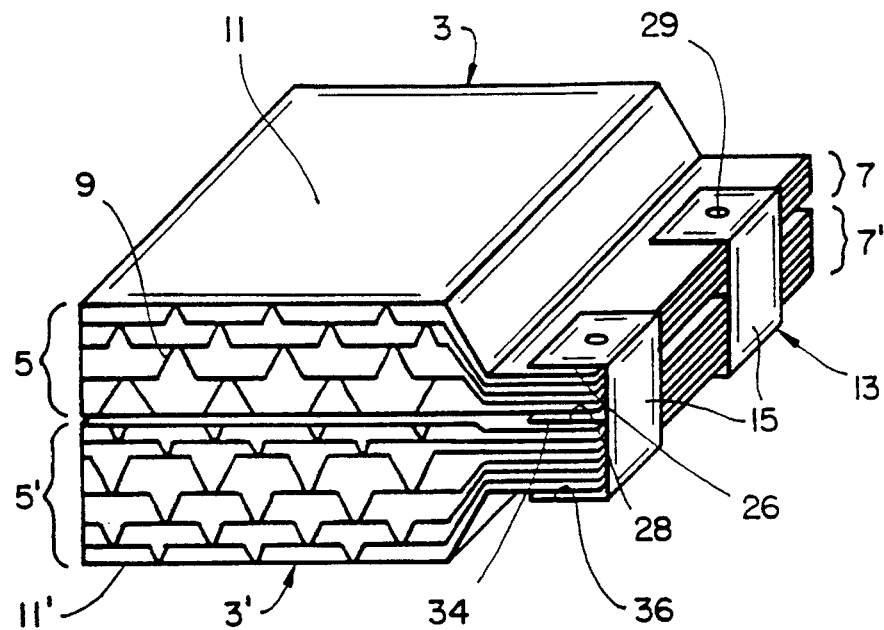
FIG_8
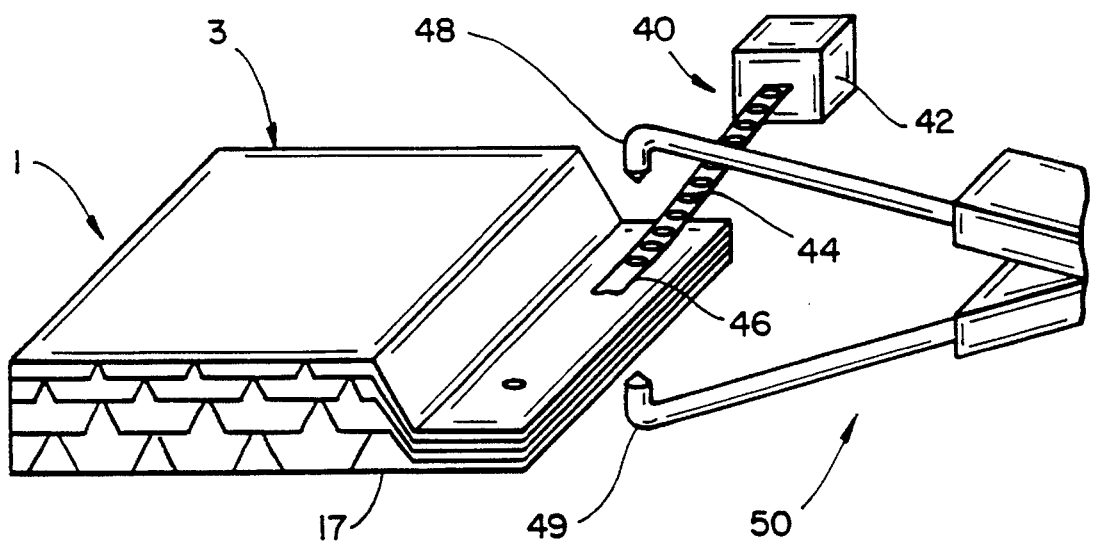
FIG_9

5,524,406

INSULATING APPARATUS AND METHOD FOR ATTACHING AN INSULATING PAD TO A SUPPORT

FIELD OF THE INVENTION

The present invention relates to a heat insulating apparatus comprising a heat insulating pad attached to a frame or a support which can be used as a heat reflecting shield as well as a heat sink for dissipating heat at a desired location. More particularly, it relates to a heat insulating pad made of thin metal foils attached to a frame or support by resistance welding methods.

BACKGROUND OF THE INVENTION

Various pads, panels and structural elements have been proposed for insulation purposes. In particular, insulating panels have been proposed for use as heat and sound insulation in the construction and automotive fields. These panels are used on the exterior of motor vehicles to shield the vehicle floor from the heat that is released by the exhaust system, drive train, etc.

Certain characteristics are desirable for an insulating apparatus, particularly in the motor vehicle field. The apparatus must be shapeable so that it can be adapted to the contours of the vehicle parts which are to be insulated. Sound insulation is often necessary. Due to the stringent requirements of extended product life, high resistance to corrosion is required today, particularly where the product that is subject to corrosion comes into direct contact with moisture and with corrosion-promoting substances, such as brake dust, road salt, etc. A support member is desirable to provide structural integrity to the insulating apparatus and provide a convenient means for attaching the apparatus to the vehicle.

For example, U.S. Pat. No. 5,011,743 ("Sheridan et al.") discloses a pad including thermal insulation in heat sink areas whereby the pad can be used as a heat reflecting shield as well as a heat sink for dissipating heat at a desired location. The pad includes a plurality of layers of metal foil forming a stack wherein the layers are arranged one above another in a vertical direction, the stack includes at least one heat sink area wherein the layers are closer together in the vertical direction than in the insulating area of the stack adjacent to the heat sink area. The heat sink area conducts a greater amount of heat between opposite surfaces of the pad than does the thermal insulating area.

Sheridan et al. discloses a heat sink area which comprises a compressed area of the stack, shown as the outer periphery of the heat insulating pad which extends around the insulating area. The layers in the heat sink area are secured together by such means as staples, adhesive, or crimping of the top layer over the other layers in the heat sink area. Additional means of securing the layers together include interengaging the layers with each other by punching at least one opening through the layers, or providing a mechanical bond of the individual layers to each other, such as by ultrasonic welding which causes the aluminum oxide layer on the aluminum to be removed and the individual layers to be bonded to each other.

Various insulating devices with support members exist. For example, U.S. Pat. No. 2,180,373 ("Sibley et al.") discloses a heat insulating panel which includes a metal basket, a heat reflective inner lining covering the inner walls of the basket and a plurality of thin strips of heat reflective material, such as thin aluminum foil, which has been crumpled by hand or any simple means to form a large number of irregular surfaces which provide point contact between the layers. The thin aluminum foil strips disclosed in Sibley et al. can be fastened at each end thereof to the inner lining of the basket with adhesive and a cover can be provided on the basket to encase the lining and the thin aluminum foil layers. The layers of metal foil are arranged in the basket, then a sheet metal cover is attached to the basket, not to the metal foil, by separate metal connectors that space the basket away from the sheet metal cover, thereby protecting the metal foils from being compressed.

U.S. Pat. No. 1,934,174 ("Dyckerhoff") discloses a heat insulating body which includes a plurality of metal foil sheets which have been stamped, bent, or crumpled to form projections which maintain the sheets at point contact when assembled in a stack. Dyckerhoff discloses that the foil can be crumpled or distorted by hand or machine then applied to the surface of the member to be insulated, it being unnecessary to lock these sheets to each other to maintain the irregular shape necessary to provide air spaces between the sheets.

Dyckerhoff discloses that a protective casing can be provided to protect the insulation from outside pressures but when the insulation is used for filling air spaces created by usual structural members, such as walls or ceilings, no special casing is necessary, whereas in the case of making pipe coverings, an outside shell which may be made of metal heavier than the foil is advisable. Dyckerhoff discloses the use of pins or nails to attach the protective casing over the metal foil.

U.S. Pat. No. 2,926,761 ("Herbert") discloses a heat insulating panel having a pad made of incombustible material of low thermal conductivity which has a series of small holes made through it every two inches. The pad is preferably made of quartz glass woven fabric but may be made of other incombustible materials of low thermal conductivity. The pad is placed between two sheets of stainless steel preferably having a thickness of from 0.001 to 0.003 inches. The sheets are pressed together at each hole by the electrodes of a spot welding machine and tack welded together. In the alternative, sheets may be stitched together or secured by small staples or rivets at each hole.

It is generally known in the art to attach heat insulating pads made of thin metal foils to support means by use of rivets, staples, or adhesives. These methods have various cost, manufacturing, and effectiveness limitation. The use of rivets or staples damages the structural integrity of the insulating pad and the support means. The use of adhesives is costly, sometimes toxic, and has limited effectiveness under some operating conditions.

SUMMARY OF THE INVENTION

An object of the present invention is to provide an insulating pad of stacked metal foil layers attached to a support means that is secure and cost-effective. A further object is to provide a convenient means for supporting and installing the insulating pad. In particular, an object of the present invention is to provide an insulating pad attached to a support means by resistance welding.

In accordance with a preferred embodiment of the invention, the insulating apparatus comprises an insulating pad comprising a plurality of layers of metal foil, wherein at least two of said layers are separated from each other by a spacing means to provide gas, such as air, spaces between said layers, for example, by a plurality of embossments on at least one of said layers, and a support means for supporting at least a portion of the insulating pad and attached to the insulating pad by resistance welding, whereby the plurality of layers of metal foil are compressed around the area of the weld.

In one embodiment of the invention, the support means comprises a channel member having opposing flanges, such as a U-shaped member, a C-shaped member, a V-shaped member, or a multi-channel member such as an E- or S-shaped member.

In another embodiment of the invention, the support means comprises a first member of resistance weldable material and a second member of resistance weldable material. Such members may be a pan, frame, or other suitable means.

In another embodiment of the invention, at least a portion of the insulating apparatus is flexible for better shapeability and ease of installation.

In another embodiment of the invention, the support means comprises a first member of resistance weldable material, a second member of resistance weldable material, and a pan or frame interposed between the first member and the second member.

In another embodiment of the invention, the insulating apparatus comprises an insulating pad comprising a plurality of layers of metal foil, wherein at least two of said layers are separated from each other by a spacing means for providing gas spaces between said layers, a first support means and a second support means, wherein the first support means and the second support means are resistance welded together through the plurality of layers of metal foil, whereby the plurality of layers are compressed around the area of the weld. In accordance with the invention, the second support means can be a frame, pan, or other suitable means.

In accordance with another embodiment of the invention, the second support means comprises a second member of resistance weldable material and a pan or frame interposed between the first member and the second member. Likewise, in this embodiment, the pan or frame can be aluminum, copper, magnesium, titanium, brass, or the like.

In one of its method aspects, the present invention provides a method of making a heat insulating apparatus having an insulating pad and a support means attached thereto by resistance welding. The method comprises providing an insulating pad comprising a plurality of layers of metal foil, wherein at least two of said layers are separated from each other by a spacing means for providing gas spaces between said layers, placing a portion of said insulating pad in a support means wherein the portion of the insulating pad is between two opposing faces of the support means and resistance welding the two opposing faces of the support means together through the plurality of layers of metal foil, whereby the plurality of layers are compressed around the area of the weld.

In another one of its method aspects, the present invention comprises providing an insulating pad having a first side and a second side, the insulating pad comprising a plurality of layers of metal foil, wherein at least two of said layers are separated from each other by a spacing means for providing gas spaces between said layers, placing a first support means over at least a portion of the first side of the insulating pad, placing a second support means over at least a portion of the second side of the insulating pad, and resistance welding the first support means and the second support means together through said plurality of layers of metal foil, whereby said plurality of layers are compressed around the area of the weld.

In accordance with the method of the invention, the resistance welding can comprise spot welding, seam welding or the like. Also in accordance with the method of the invention, resistance weldable material can be automatically placed at the place to be welded.

BRIEF DESCRIPTION OF THE DRAWINGS

The invention will now be described with reference to the accompanying drawings, in which:

FIG. 1 is a top plan view of the insulating apparatus consisting of broken-out sections illustrating different means of attaching a support to an insulating pad according to the invention:

FIG. 2 is a perspective view of a cross-section of the insulating apparatus shown in FIG. 1 and taken along the line 2—2 according to one embodiment of the invention;

FIG. 3 is a perspective view of a cross-section of the insulating apparatus shown in FIG. 1 and taken along the line 3—3 according to yet another embodiment of the invention;

FIG. 4 is a perspective view of a cross-section of the insulating apparatus shown in FIG. 1 and taken along the line 4—4 according to another embodiment of the invention;

FIG. 5 is a perspective view of a cross-section of the insulating apparatus shown in FIG. 1 and taken along the line 5—5 according to another embodiment of the invention; and FIG. 6 is a perspective view of another embodiment of the invention wherein a portion of the insulating pad and the support are flexible.

FIG. 7 is a perspective view of yet another embodiment of the invention wherein a multi-channel member is used as the support.

FIG. 8 is a perspective view of still another embodiment of the invention wherein two insulating pads are attached to a multi-channel member.

FIG. 9 is a perspective view of an automatic feeding system for supplying resistance weldable material to the area to be welded.

DETAILED DESCRIPTION OF THE INVENTION

Referring to FIG. 1, an insulating apparatus 1 comprising an insulating pad 3 and a support means 13 is provided which can be used as a heat reflecting shield, as well as a heat sink for dissipating heat at a desired location. An insulating apparatus 1 according to the present invention is particularly useful for providing "hot spot" insulation, wherein the pad 3, which is larger than a heat source, can be used to shield an area in the vicinity of the heat source for radiating heat back towards the heat source and to conduct heat which penetrates pad 3 to a desired location such as along the outer periphery of the pad.

For instance just by way of example, if a heat source is at a temperature of 250° C., it is possible to reduce the temperature on a side of the pad 3 facing away from the heat source to a lower temperature, say around 50° C. On the other hand, heat which penetrates pad 3 can be conducted to a heat sink area 7 of the pad. For instance, if the heat sink area 7 is located at the outer periphery of pad 3, it is possible to carry heat away from the center zone of pad 3.

In accordance with the invention, heat sink area 7 conducts heat from the surface of pad 3 facing the heat source to the opposite surface with a lower temperature therebetween than in the area of pad 3 facing the heat source. Just by way of example and not being limited to any theory, the center of pad 3 could comprise a thermal insulating area 11 with a temperature differential of 200° C. between the surface facing the heat source and an opposite surface of pad 3, whereas heat sink area 7 of pad 3 could have a temperature differential of about 25° C. between the surface of pad 3 facing the heat source and an opposite surface thereof.

Insulating pad 3 is of the type disclosed in U.S. Pat. Nos. 5,011,743 and 5,111,577 to Sheridan et al., which are incorporated herein by reference in their entirety. Pad 3 includes heat sink and thermal insulating areas, heat sink area 7 conducting a greater amount of heat between opposite surfaces of pad 3 than does thermal insulating area 11. Pad 3 includes a plurality of layers 5 of metal foil forming a stack, wherein the layers are arranged one above another in a vertical direction, the stack including at least one heat sink area 7 wherein the layers are closer together in the vertical direction than in insulating area 11 of the stack adjacent to heat sink area 7, at least one of the layers including a plurality of embossments 9 therein separating the one layer from an adjacent one of the layers in insulating area 11. In particular, heat sink area 7 could comprise a compressed outer periphery of the stack which extends horizontally in a transverse direction perpendicular to the vertical direction completely around insulating area 11. Pad 3 can include a single insulating area (as shown in FIG. 1) or a plurality of insulating areas. Heat sink area can partially surround insulating area 11 or can completely surround insulating area 11.

As shown in FIGS. 2–6, pad 3 according to the invention includes a plurality of layers 5 of metal foil. The layers 5 of metal foil are flexible. The metal foil can comprise aluminum, copper, brass, magnesium, titanium, or any other suitable metal or alloy. Preferably, the metal foil used has a high rate of thermal conductivity, such as in the range of 0.10 to 0.05 (watts/mm$^2$)(° C./mm). The thickness of the each layer can be any thickness, preferably between 0.1 to 7 mils ($2.54 \times 10^{-4}$ to $1.78 \times 10^{-2}$ cm), more preferably 1 to 3 mils ($2.54 \times 10^{-3}$ to $7.62 \times 10^{-3}$ cm), and most preferably 2 mils ($5.08 \times 10^{-3}$ cm) (1 mil=0.001 inches=$2.54 \times 10^{-3}$). It is contemplated that each layer can be different thicknesses or the thickness of each layer can be the same. It is further contemplated that the foil used can comprise steel, stainless steel, iron, or the like as long as the foil to be used has a higher rate of thermal conductivity than the materials that it is to be welded between.

The layers are preferably aluminum foil since the reflectivity of aluminum is on the order of 95% and the emissivity thereof is on the order of about 10%. The emissivity of the sheets can be dramatically increased. However, by coating the sheets with a black surface coating. Of course, the reflectivity of the sheets decreases proportionately to the emissivity. Accordingly, insulating apparatus 1 of the invention can be designed with a particular use in mind. That is, layers 5 of pad 3 can be made brighter at areas which should remain cool and can be made darker at areas where it is desired to radiate heat from pad 3.

As shown in FIGS. 2–6, layers 5 are arranged one above another in a vertical direction. Insulating pad 3 includes at least one heat sink area 7, wherein layers 5 are closer together in the vertical direction than layers 5 in insulating area 11 adjacent to heat sink area 7. At least one of the layers in insulating area 11 includes a plurality of embossments 9 therein separating at least one layer from an adjacent layer.

It is contemplated that layers 5 in heat sink area 7 can be in contact with each other or not in direct contact with each other but layers 5 in the heat sink area 7 should provide better heat conduction in the vertical direction than in the insulating area 11.

It is contemplated that insulating pad 3 can include two layers only one of which includes embossments 9. In a preferred embodiment, however, at least two of the layers adjacent to each other include a pattern of embossments 9. The layers 5 being offset with respect to each other such that at least some of embossments 9 are not aligned in the vertical direction. With this arrangement, layers 5 can be provided in point contact to minimize heat transfer therebetween in the vertical direction. Embossments 9 can be provided in uniform patterns or non-uniform patterns on the sheets. Furthermore, embossments 9 can be provided such that they extend into only one surface of the sheets or the embossments can be provided such that they extend in both surfaces of the sheets.

It is further contemplated that insulating pad 3 can be comprised of thin foil layers with spacing means therebetween other than embossments for creating gas, such as air, spaces between the layers 5. For example, the spacing means may be a mesh screen, shredded toil, metal filaments, random metallic fibers, or the like.

In one embodiment, at least one of the layers can include heat radiating means thereon. The heat radiating means can comprise a black surface on at least part of at least one side of at least one of the layers. For instance, heat sink area 7 can be coated with the black surface or various parts of insulating pad 3 can include the black surface. The black surface allows pad 3 to radiate 95% of the heat, whereas if aluminum foil remains bright only 10% of the heat is radiated. Accordingly, the black coating can be provided in areas of which it is desired to radiate heat away from insulating apparatus 1.

As an example, if one side of pad 3 faces a heat source, it would be desirable to leave that surface bright to reflect heat back toward the heat source and if the heat sensitive component was located on the opposite side of pad 3, it would be desirable to leave that surface bright also to prevent heat from radiating toward the component. On the other hand, if the outer edges of pad 3 are located in an area in which air freely circulates, it would be desirable to compress pad 3 in those areas to provide heat sink areas 7 and provide the black coating thereon to enhance dissipation of heat from pad 3 in those areas.

If one surface of pad 3 faces the heat source and the opposite side of pad 3 faces an open area at which a heat sensitive component is not located, it may be desirable to black coat the entire area of pad 3 facing away from the heat source. Furthermore, one or more of the interior layers of pad 3 can be coated with the heat radiating means in any desired pattern on one side or both sides thereof. The coating thus cooperates with heat sink area 7 to direct heat to a desired area on pad 3. Typically, a coating can be provided on the lower layers of pad 3 facing the heat source and will extend to heat sink area 7 to conduct heat away from the heat source.

Pad 3 can also include at least one layer of scrim. Scrim can comprise a heat resistant material such as flame retardant polyester ("FRPE"), refractory paper, fiberglass non-woven fabric, a ceramic non-woven fabric or other suitable material. Scrim is typically about 1 mil ($2.54 \times 10^{-3}$ cm) or less in thickness and of a fabric material. Scrim can be provided within one to two layers of the top of pad 3, but does not extend into heat sink area 7.

The distinct advantages of the invention are best illustrated by reviewing, briefly, standard resistance welding techniques which may be applied.

Spot welding is one resistance welding technique which may be applied. In practice, for example, two sheets of resistance weldable material, such as steel, iron or the like, to be spot welded are placed between electrodes, and then an electrical current is passed through the sheets. Because of the contact resistance at the interface between the sheets (the faying interface), a thermal gradient exists through the thickness of the sheets and the weldable material at the interface reaches its melting temperature. At an appropriate time, the current flow is terminated and the molten material solidifies into a nugget. The location and size of the nugget depends upon location and size of the electrodes, the amperage used, and the amount of time the current is applied.

The steepness of the thermal gradient through the thickness of the sheet is a function of, among other things, the contact resistance at the faying interface, electrical resistance of the weldable material, and the contact resistance at the electrode-sheet interface. The greater the faying interface resistance with respect to the other resistances in the current path, the steeper the thermal gradient. The geometry, heat extraction, temperature, and thermal conductivity of the electrodes are other factors controlling the slope of the thermal gradient.

Seam welding is another welding technique that may be applied to the present invention. Seam welding is identical to spot welding, except that the electrodes are in the form of wheels, and the spot welds are overlapped to provide a continuous weld. It is contemplated that other resistance welding techniques may be applied to the present invention, such as projection welding. See U.S. Pat. No. 3,113,202 issued to Nolen et al.

According to a preferred embodiment, the layers 5 can be in contact with each other in heat sink area 7 and a support means 13 can be attached by resistance welding methods for supporting insulating pad 3. Support means 13 can include an open frame 15, a pan 17, a strip 23, a clip 25, or any combination thereof. It is contemplated that support means 13 may have tabs, loops, extensions, or the like for facilitating attachment to the device to be insulated or to other devices. Support means 13 receives the layers 5 as shown in FIGS. 2–6. The resistance welding methods for attaching support means 13 to insulating pad 3 include spot welding, seam welding, or the like.

It has been discovered that the metal foils that make up the layers 5 do not have enough structural integrity to properly bond under the application of intense heat associated with resistance welding. Without being limited to any theory, it is believed that the thin foil evaporates at the point of contact of the resistance welding electrodes upon the application of a welding current. However, surprisingly it has been found that an insulating pad 3 constructed of metal foils can be resistance welded to support means 13 by the methods of this invention.

The preferred metal foil used for each layer is aluminum having a thickness of about 2 mils ($5.08 \times 10^{-3}$ cm). However, the thickness of the layers can be adjusted to suit insulating needs. For instance, thicker sheets provide better lateral heat transfer. It is also within the scope of the invention to provide layers which are thicker in parts thereof for providing better lateral heat transfer in that particular area of the insulating apparatus where better lateral heat transfer is desired.

In accordance with the invention, a portion of insulating pad 3 consisting of a plurality of layers 5 of metal foil, such as heat sink area 7 is placed between two surfaces (faces) 26, 28 made of resistance weldable material. The two surfaces 26, 28 of the resistance weldable material are welded together through the plurality of layers 5 of metal foil, whereby the plurality of layers 5 of metal foil are compressed around the area of the weld. The resistance weldable materials used can comprise steel, iron, or other suitable alloy. Preferably, the resistance weldable material used has a high coefficient of electrical resistivity ($\rho$), such as in the range of $95 \times 10^{-9}$ to $750 \times 10^{-9}$ ohm·m, and rates of thermal conductivity lower than the foil used.

The number, size and type of weld, amperage, size of electrodes. etc. depend on several factors, including but not limited to: the thickness of the insulating pad; the thickness of the support means; the width of the support means; the width of the area of the insulating pad to be covered by the support means; the dimensions of the pad; the dimensions of the support means; the desired shape of the insulating apparatus; the operating environment of the insulating apparatus: etc. The particular number, size and type of weld, amperage, size of electrodes, etc. employed are selected relative to these factors and it is well within the skill of the art to make this selection.

In one embodiment, support means 13 can be comprised of clips 25 that are U-, V-, C-, or similar shaped channels and pan 17 as shown in FIG. 2. In general, the configuration of support means 13 can be a wide variety of shapes that have opposing faces. For a C-shaped member, typically the opposing faces are connected by a curved connecting portion. For a U-shaped member, typically the opposing faces are connected by a straight connecting portion. For a V-shaped member, typically the opposing faces are connected by an angled connecting portion. In some embodiments, the angled connecting portion straightens out into generally parallel opposing faces. Clips 25 have opposing flanges or faces 26, 28 and are made of a resistance weldable material. Pan 17 is made of aluminum, copper, magnesium, titanium, brass, or the like. It is also contemplated that pan 17 may be made of a resistance weldable material, such as steel, iron, or the like. Pan 17 helps to protect insulating pad 3 from damage or deformation, such as that caused by rocks, sand, and debris that may be thrown up from a road surface by the tires of a vehicle. Insulating pad 3 is attached to pan 17 by resistance welding the opposing faces 26, 28 of the clips 25 together through pan 17 and the layers 5 of metal foil. The clips 25 can be spaced regularly or irregularly around the periphery of pad 3, or used in combination with open frames 15. The clips 25 can be small enough to allow the insulating apparatus 1 to be easily shaped to conform to various contours to which it is attached.

In another embodiment, support means 13 can be comprised of strip 23 and pan 17 as shown in FIG. 3. The strip 23 and pan 17 are made of a resistance weldable material. Insulating pad 3 is attached to pan 17 by resistance welding a face 26 of strip 23 to an opposing face 28 of pan 17 through the layers 5 of metal foil. Strip 23 can be used around the entire periphery of pad 3, spaced around the periphery at specified locations for a specific use, or used in combination with open frames 15 or clips 25. It is contemplated that strip 23 can include a flexible portion wherein strip 23 can be shapeable along with insulating pad 3. Strip 23 provides structural integrity to the insulating apparatus 1 and a variable number of ways to attach to the insulating apparatus 1 to a vehicle or any structure to be insulated.

It is contemplated that pan 17 may be made of aluminum, copper, magnesium, titanium, brass, or the like and that a strip 23 is placed on either side of pad 3. It is also contemplated that pan 17 may be made of a resistance weldable material, such as steel, iron, or the like. Insulating pad 3 is attached to pan 17 by resistance welding a face 26 of strip 23 to an opposing face 28 of the second strip 23 through the layers 5 of metal foil.

In another embodiment, a top sheet 21 can extend around the outer edges of the layers 5 in heat sink area 7, top sheet 21 including a portion 21a which is crimped or otherwise secured beneath the bottom of the layers 5 as shown in FIG. 4. A hermetic seal can be provided around the outer edges of insulating pad 3 and the interior of pad 3 can include a gas such as Xenon to provide low heat transfer between the layers 5. Insulating pad 3 having the hermetically sealed heat sink area 7 can be attached to a frame 15.

Open frame 15 can be a U-, V-, C-, or similar shaped channel that is placed over heat sink area 7 as shown in FIG. 4. Open frame 15 has opposing flanges or faces 26, 28 and is made of resistance weldable material. Open frame 15 can extend around the entire periphery of insulating pad 3 or around a portion of pad 3 as shown in FIG. 1.

It is contemplated that open frame 15 can include a flexible portion 27 as shown in FIG. 6, whereby frame 15 is shapeable. Insulating pad 3 can include perforations 33, indentations, or the like to help facilitate the flexibility of insulating apparatus 1. Insulating pad 3 is secured to frame 15 by resistance welding opposing laces 26, 28 together through the layers 5 of metal foil. It is contemplated that a pan can also be attached to the hermetically sealed insulating pad.

In another embodiment, open frame 15 can be a multi-channel member such as an E-shaped member as shown in FIG. 7. If an E-shaped member is used, a plurality of layers of pad 3 are placed between a first set of opposing faces 26, 28 and a plurality of layers of pad 3 are placed between a second set of opposing faces 34, 36. Pad 3 is secured to the frame 15 by resistance welding the first set of opposing faces 26, 28 together and the second set of opposing faces 34, 36 together through the layers of metal foil.

In another embodiment of the present invention, two insulating pads 3 and 3' can be attached to the E-shaped member as shown in FIG. 8 or a S-shaped member (not shown). A first pad 3 is placed between a first set of opposing faces 26, 28 and a second pad 3' is placed between a second set of opposing faces 34, 36. First pad 3 is secured to frame 15 by resistance welding the first set of opposing faces 26, 28 together through the layers of metal foil. Second pad 3' is secured to frame 15 by resistance welding the second set of opposing faces 34, 36 together through the layers of metal foil.

In another embodiment, pan 17 can extend over the outer edges of the layers 5 in heat sink area 7 as shown in FIG. 5. Pan 17 includes a portion 17a which is folded, curled around, or otherwise secured above the top of the layers 5 in heat sink area 7. Pan 17 is made of resistance weldable material. One face 26 of portion 17a is resistance welded to opposing face 28 of pan 17 through the layers 5 of metal foil.

In accordance with one of the method aspects of the present invention, the foregoing insulating apparatus 1 can be made by the method of providing an insulating pad 3 of the type described above. Placing insulating pad 3 in a support means 13, wherein a portion of insulating pad 3, such as heat sink area 7, is between two opposing faces 26, 28 of the support means 13. Then resistance welding the two opposing faces 26, 28 of support means 13 together through the plurality of layers 5 of metal foil, whereby the plurality of layers 5 of metal foil are compressed around the area of the weld.

It is contemplated that support means 13 comprises a resistance weldable member such as open frame 15, pan 17, strip 23, clip 25, or any combination thereof. It is further contemplated that pan 17 can be interposed between the two opposing faces 26, 28 of the support means. It is further contemplated that open frame 15 can be a multi-channel member such as an E- or S-shaped member.

The resistance welding method comprises spot welding, seam welding, or the like. The particular number, size, type of weld, amperage, size of electrodes, etc. employed are selected relative to factors discussed above, and it is well within the ordinary skill of the art to make this selection.

In accordance with another one of the method aspects of the invention, the foregoing insulating apparatus 1 can be made by the steps of providing insulating pad 3 of the type described above. Placing a first support member over at least a portion of a first side of insulating pad 3. Placing a second support member opposite of the first support member and over at least a portion of a second side of insulating pad 3. Then resistance welding the first support member and the second support member together through the plurality of layers 5 of metal foil whereby the plurality of layers 5 are compressed around the area of the weld.

It is contemplated that the first support member be one of two opposing faces 26, 28 of open frame 15 comprising a U-, V-, C-, or similar shaped channel made of resistance weldable material and that the second support member be the other opposing face. It is further contemplated that the first support member be one of two opposing faces of clip 25 comprising a U-, V-, C-, or similar shaped channel made of resistance weldable material and that the second support member be the other opposing face. It is also contemplated that the first support member be a first set of opposing faces 26, 28 of a multi-channel member and the second support member be a second set of opposing faces 34, 36.

It is further contemplated that the first support member be pan 17 or strip 23 of resistance weldable material and the second support member be pan 17 or strip 23 of resistance weldable material. The resistance welding method comprises spot welding, seam welding, or the like.

In another one of its method aspects, a feeding system can be used to supply the resistance weldable material, such as a steel disk or slug, to the area to be welded. With reference to FIG. 9, a feeding system 40 comprising feeder 42 and slug (resistance weldable material) carrier 46 can be used to supply the material or slugs 44 to one side of the insulating pad 3 when the pan 17 or a support on the other side is a resistance weldable material. Welding system 50 with upper electrode 48 and lower electrode 49 is synchronized with feeding system 40. Feeder 42 advances slug 44 on slug carrier 46 to a predetermined point on one side of insulating pad 3. When slug 44 is aligned between the electrodes, the electrodes pinch together and slug 44 is spot welded to pan 17. Then insulating apparatus 1 and slug carrier 46 advance to another predetermined point where the electrodes again spot weld the slug 44 to the pan 17. A similar method can be accomplished with a seam welding apparatus, in which a strip of resistance weldable material is fed between the seam welding electrodes. A support, strip, clip, etc. can be placed between the slug and the insulating pad. It is also contemplated that the welding system 50 may be moved instead of insulating pad 3 and slug carrier 46. Also, a double feeding system can be used to supply the resistance weldable material to both sides of the insulating pad when the pad or support is not a resistance weldable material.

An example of the insulating apparatus in accordance with the present invention can be illustrated as follows. An insulating pad comprising five layers of aluminum foil, the top and bottom layers being 2 mils ($5.08 \times 10^{-3}$ cm) in thickness and the three intermediate layers being 7 mils ($1.78 \times 10^{-2}$ cm) in thickness. The overall size of the pad is 12 inches (30.48 cm) wide by 20 inches (50.9 cm) long and the pad is about 5 millimeters in thickness. The heat sink area can be 3–10 millimeters in width, e.g. 6 millimeters. The embossments are about 1 millimeter in height.

The insulating apparatus also includes a steel pan having a thickness of about 20 mils ($5.08 \times 10^{-2}$ cm). The pan is useful for protecting the pad from rocks, debris, etc. if the pad is mounted on the underside of a vehicle. The pan is attached to the insulating pad by spot welding a steel strip having a thickness of about 20 mils ($5.08 \times 10^{-2}$ cm) to the steel pan through the layers of aluminum foil in the heat sink area.

While the invention has been described with reference to the foregoing embodiments, changes and variations may be made thereto which are within the scope of the appended claims. All such modifications or changes are intended to be included within the scope of the claims.

What is claimed is:

1. A method of making an insulating apparatus, comprising:
   providing an insulating pad comprising a plurality of layers of metal foil, wherein at least two of said layers are separated from each other by a spacing means for providing gas spaces between said layers;
   placing a portion of said insulating pad in a support, wherein said portion of said insulating pad is between two opposing faces of said support; and
   resistance welding the two opposing faces of said support directly together such that said plurality of layers of metal foil evaporate to attach said support to said insulating pad, whereby said plurality of layers are compressed around the area of the weld.

2. The method of claim 1, wherein said spacing means comprises a plurality of embossments on at least one of said layers.

3. The method of claim 1, wherein said resistance welding step comprises spot welding at least one spot.

4. The method of claim 1, wherein said resistance welding step comprises seam welding.

5. A method of making an insulating apparatus, comprising:
   providing an insulating pad having a first side and a second side, said insulating pad comprising a plurality of layers of metal foil, wherein at least two of said layers are separated from each other by spacing means for providing gas spaces between said layers;
   placing a first support over at least a portion of the first side of said insulating pad;
   placing a second support over at least a portion of the second side of said insulating pad; and
   resistance welding said first support and said second support directly together such that said plurality of layers of metal foil evaporate to attach said first support and said second support to said insulating pad, whereby said plurality of layers are compressed around the area of the weld.

6. The method of claim 5, wherein said spacing means comprises a plurality of embossments on at least one of said layers.

7. The method of claim 5, wherein said resistance welding comprises spot welding at least one spot.

8. The method of claim 5, wherein said resistance welding comprises seam welding.

9. An insulating apparatus, comprising:
   an insulating pad comprising a plurality of layers of metal foil, wherein at least two of said layers are separated from each other by a spacing means for providing gas spaces between said layers;
   a support having opposing faces for supporting at least a portion of said insulating pad;
   said support positioned with the opposing faces having the layers of metal foil therebetween and attached to said insulating pad by a portion of the opposing faces being resistance welded directly together without said plurality of layers of metal foil therebetween, whereby said plurality of layers are compressed around the area of the weld.

10. The apparatus of claim 9, wherein said spacing means comprises a plurality of embossments on at least one of said layers.

11. The insulating apparatus of claim 9, wherein said opposing faces of said support comprise a member having opposing flanges.

12. The insulating apparatus of claim 11, wherein said member is a U-shaped member.

13. The insulating apparatus of claim 11, wherein said member is a C-shaped member.

14. The insulating apparatus of claim 11, wherein said member is a V-shaped member.

15. The insulating apparatus of claim 11, wherein said member is a multi-channel member.

16. The insulating apparatus of claim 11, wherein said support is a pan.

17. The insulating apparatus of claim 11, wherein said support is a frame.

18. The insulating apparatus of claim 9, wherein said support comprises:
   a first member of resistance weldable material; and
   a second member of resistance weldable material.

19. The insulating apparatus of claim 18, wherein said second member is a pan.

20. The insulating apparatus of claim 18, wherein said second member is a frame.

21. The insulating apparatus of claim 9, wherein at least a portion of said insulating apparatus is flexible.

22. The insulating apparatus of claim 9, wherein said metal foil comprises aluminum, copper, magnesium, titanium, or brass having a thickness of no greater than about 2 mils.

23. The insulating apparatus of claim 9, wherein said support comprises:
   a first member of resistance weldable material;
   a second member of resistance weldable material; and
   a pan interposed therebetween said first member and said second member.

24. The insulating apparatus of claim 9, wherein said support comprises:
   a first member of resistance weldable material;
   a second member of resistance weldable material; and
   a frame interposed therebetween said first member and said second member.

25. An insulating apparatus, comprising:
   an insulating pad comprising a plurality of layers of metal foil, wherein at least two of said layers are separated from each other by a spacing means for providing gas spaces between said layers;
   a first support for supporting at least a portion of said insulating pad;

a second support for supporting at least a portion of said insulating pad; and said first support and said second support being positioned with the layers of metal foil therebetween and attached to said insulating pad by a portion of said first support and said second support being resistance welded directly together without said plurality of layers of metal foil therebetween, whereby said plurality of layers are compressed around the area of the weld.

26. The insulating apparatus of claim 25, wherein said spacing means comprises a plurality of embossments on at least one of said layers.

27. The insulating apparatus of claim 25, wherein at least a portion of said insulating apparatus is flexible.

28. The insulating apparatus of claim 25, wherein:

said first support is a member of resistance weldable material; and said second support is a member of resistance weldable material.

29. The insulating apparatus of claim 28, wherein said second support is a pan.

30. The insulating apparatus of claim 28, wherein said second support is a frame.

31. The insulating apparatus of claim 25, wherein said metal foil comprises aluminum, copper, magnesium, titanium, or brass having a thickness of no greater than about 2 mils.

32. The insulating apparatus of claim 25, wherein:

said first support is a first member of resistance weldable material; and said second support comprises:
a second member of resistance weldable material; and
a pan interposed therebetween said first member and said second member.

33. The insulating apparatus of claim 32, wherein said pan is aluminum, copper, magnesium, titanium, or brass.

34. The insulating apparatus of claim 25, wherein:

said first support is a first member of resistance weldable material; and said second support comprises:
a second member of resistance weldable material; and
a frame interposed therebetween said first member and said second member.

35. The insulating apparatus of claim 34, wherein said frame is aluminum, copper, magnesium, titanium, or brass.

36. A method of making an insulating apparatus, comprising:

providing an insulating pad having a first side and a second side, said insulating pad comprising a plurality of layers of metal foil, wherein at least two of said layers are separated from each other by spacing means for providing gas spaces between said layers;

providing a resistance weldable material feeding system to supply resistance weldable material to the first side of said insulating pad;

placing a first support over at least a portion of the second side of said insulating pad;

providing a resistance welding system synchronized with said feeding system;

aligning electrodes of said resistance welding system with said resistance weldable material at a predetermined location; and resistance welding said resistance weldable material and said first support together through said plurality of layers of metal foil, whereby said plurality of layers are compressed around the area of the weld.

* * * * *